(12) United States Patent
Rina

(10) Patent No.: US 11,015,334 B2
(45) Date of Patent: May 25, 2021

(54) MODULAR HOUSING STRUCTURE

(71) Applicant: ARTIMO S.r.l., Milan (IT)

(72) Inventor: Vincenzo Rina, Lugano (CH)

(73) Assignee: ARTIMO S.r.l., Milan (IT)

( * ) Notice: Subject to any disclaimer, the term of this patent is extended or adjusted under 35 U.S.C. 154(b) by 0 days.

(21) Appl. No.: 16/618,138

(22) PCT Filed: May 29, 2018

(86) PCT No.: PCT/IB2018/053817
§ 371 (c)(1),
(2) Date: Nov. 28, 2019

(87) PCT Pub. No.: WO2018/220530
PCT Pub. Date: Dec. 6, 2018

(65) Prior Publication Data
US 2020/0109553 A1 Apr. 9, 2020

(30) Foreign Application Priority Data
May 29, 2017 (IT) .......................... 102017000058078

(51) Int. Cl.
*E04B 1/348* (2006.01)
*B63B 3/08* (2006.01)
*E04B 1/343* (2006.01)

(52) U.S. Cl.
CPC ............ *E04B 1/34861* (2013.01); *B63B 3/08* (2013.01); *E04B 1/34331* (2013.01)

(58) Field of Classification Search
CPC .... E04B 1/34861; E04B 1/34331; B63B 3/08
See application file for complete search history.

(56) References Cited

U.S. PATENT DOCUMENTS

| 3,245,183 A * | 4/1966 | Tessin, II | E04H 1/005 |
| | | | 52/243 |
| 7,007,620 B2 * | 3/2006 | Veazey | B63B 35/44 |
| | | | 114/77 R |
| 7,373,892 B2 * | 5/2008 | Veazey | B63B 3/08 |
| | | | 114/77 R |
| 2007/0283866 A1 * | 12/2007 | Veazey | B63B 5/18 |
| | | | 114/77 R |

FOREIGN PATENT DOCUMENTS

| DE | 102008055976 A1 * | 5/2010 | ......... E04B 1/34838 |
| DE | 102008055976 A1 | 5/2010 | |
| WO | WO-2009117856 A2 * | 10/2009 | ............ B63B 35/44 |
| WO | WO 2009117856 A2 | 10/2009 | |

* cited by examiner

*Primary Examiner* — S. Joseph Morano
*Assistant Examiner* — Jovon E Hayes
(74) *Attorney, Agent, or Firm* — Aslan Law, P.C.

(57) ABSTRACT

A modular housing structure comprising a plurality of modular elements each having a relative bearing structure defining an inner housing volume, and relative removable union components/devices for the reciprocal connection, associated with the bearing structure, wherein each of the modular elements comprises relative removable union components/devices for the reciprocal connection, and wherein the union components/devices are associated with the bearing structure and are of the magnetic type.

20 Claims, 3 Drawing Sheets

MODULAR HOUSING STRUCTURE

CROSS-REFERENCE TO RELATED APPLICATIONS

This application claims priority to IT Patent Application No. 102017000058078 filed on May 29, 2017, and to PCT Application No. PCT/IB2018/053817 filed on May 29, 2018, the entire contents of which are hereby incorporated by reference.

TECHNICAL FIELD

The present invention relates to a modular housing structure.

BACKGROUND ART

The construction and installation of prefabricated housing units is known.

Prefabricated housing units are dwelling houses, or portions of them, which are made using elements manufactured before being installed on the worksite, of which the place of manufacture is an industrial facility different from the place of installation.

The structures of this type are made of various types of materials, including wood, plasterboard and preformed concrete.

In actual fact, different types of prefabricated units exist, divided up according to the degree of assembly with which they are marketed.

In particular, housing units exist which are built as ready-to-use homes, i.e., which are produced, sold and transported already assembled by the manufacturer, and which contain at least the minimum amenities necessary for the house, such as toilets, sewage network, electrical system, etc.

Such housing units have the advantage of being immediately available for installation, without having to wait for assembly times, in fact they are typically used in contexts where rapid installation is required, such as emergency contexts for example.

In these cases, installation involves only the transport and deposition of the structure.

However, ready-to-use prefabricated housing units are not modular and the distribution of interior spaces is not flexible inasmuch as the division of the interior spaces is established during the production stage.

Furthermore, these prefabricated housing units, or parts thereof, are particularly bulky and their transport is very difficult, so their movement requires the use of oversize load transport.

A particular case of ready-to-use prefabricated units concerns large boats with cabins, such as, e.g., catamarans, which therefore have an interior living space. In this case, the distribution of the interior spaces is determined during the design phase and assembly takes place entirely on the worksite, so it is not possible to make subsequent substantial changes.

Furthermore, such boats can only be transported after installation, which makes it extremely difficult to transport them.

Prefabricated housing units also exist on the market that can be assembled, or made by combining and assembling industrially produced elements, in particular panels, beams and the like.

Generally, structures of this type are assembled "dry" at the installation site, i.e. the assembly is carried out by means of screws, bolts, welding, gluing, interlocking, etc.

However, in the case of housing units to be assembled, the considerable time and cost involved in the assembly and installation of the prefabricated elements must be taken into account.

Furthermore, it is necessary to provide for the minimum amenities and masonry raceways required for the installation of the sewers and electrical system, with a further increase in the time required for the installation of the housing unit and an increase in the costs associated with construction.

DESCRIPTION OF THE INVENTION

The main aim of this invention is to provide a modular housing structure which permits obtaining a modular housing structure that is modular and permits flexible management of the interior spaces.

Within the illustrated aim, one object of the present invention is to make a modular housing structure which allows reducing the time and costs tied to assembly and installation.

Another object of the present invention is to allow a reduction of the overall dimensions during the transport phase, eliminating the need to resort to oversize load transport for the movement to the place of installation.

Another object of the present invention is to provide a modular housing structure which allows overcoming the aforementioned drawbacks of the prior art within the scope of a simple, rational, easy, efficient to use and cost-effective solution.

The aforementioned objects are achieved by the present modular housing structure according to claim 1.

BRIEF DESCRIPTION OF THE DRAWINGS

Other characteristics and advantages of the present invention will become more evident from the description of a preferred, but not exclusive embodiment of a modular housing structure, illustrated by way of an indicative, but non-limiting example, in the attached drawings in which.

EMBODIMENTS OF THE INVENTION

Figure 1:
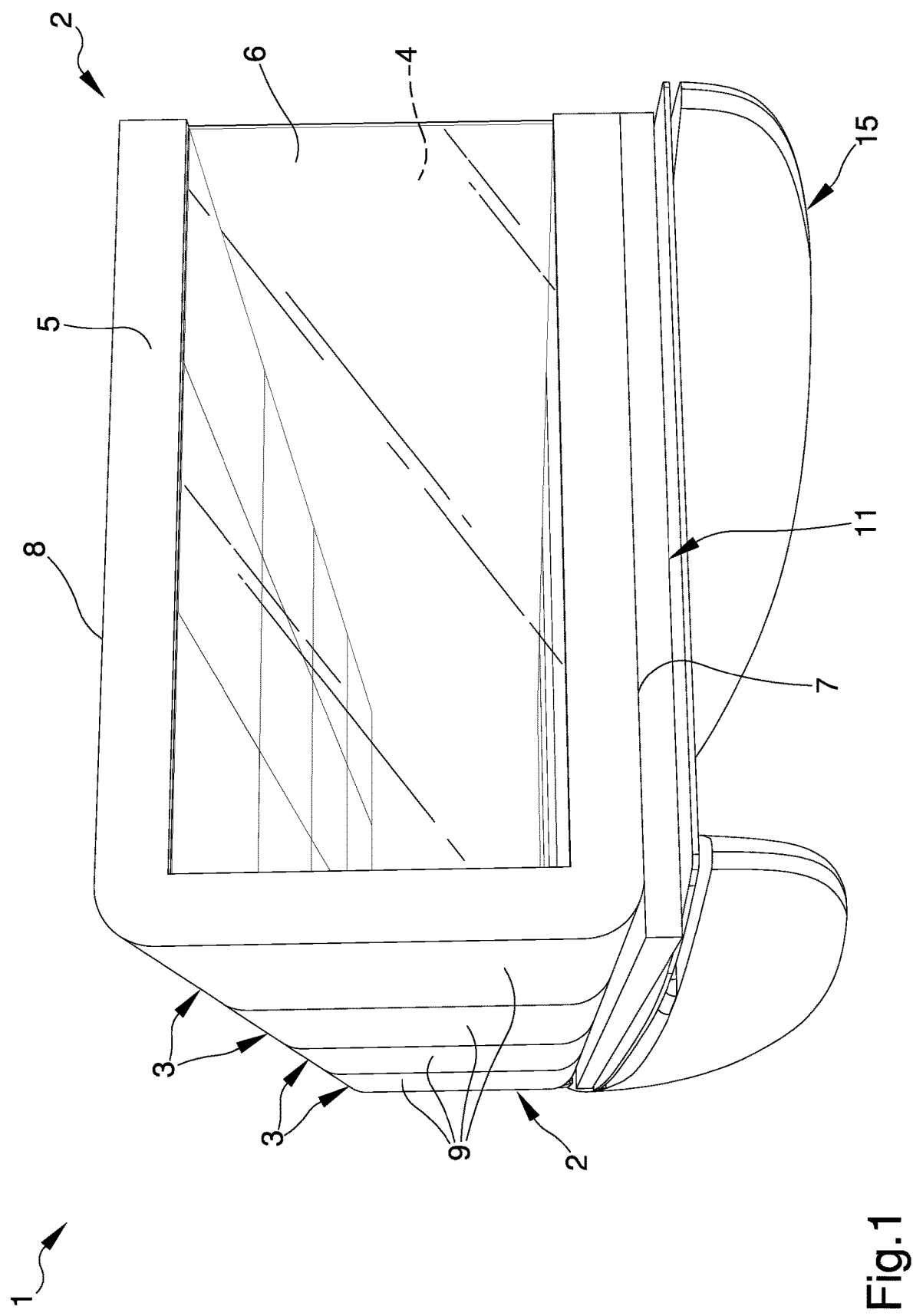
FIG. 1 is an axonometric view of the modular housing structure according to the invention.
Figure 2:
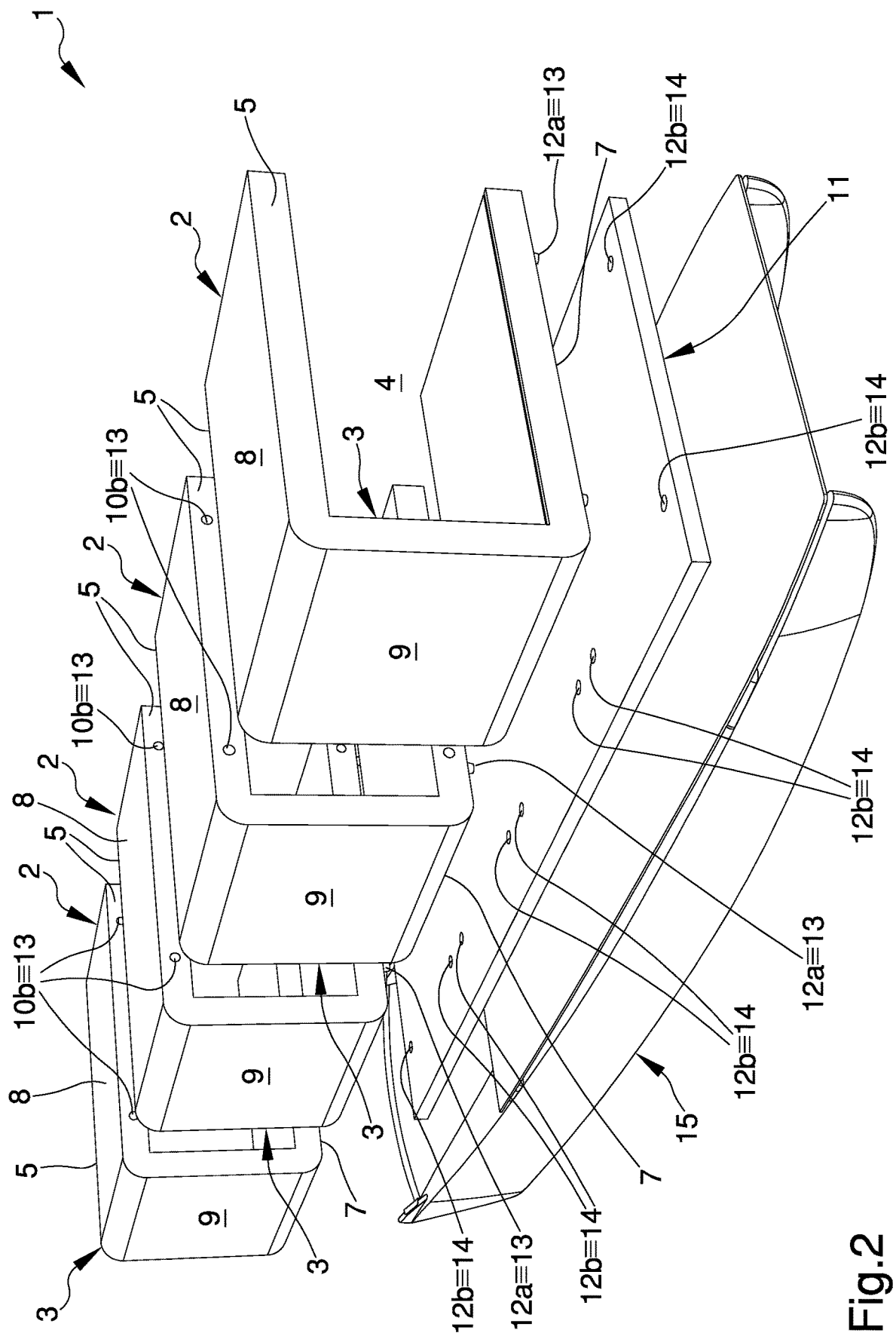
FIG. 2 is an exploded view of the modular housing structure according to the invention.
Figure 3:
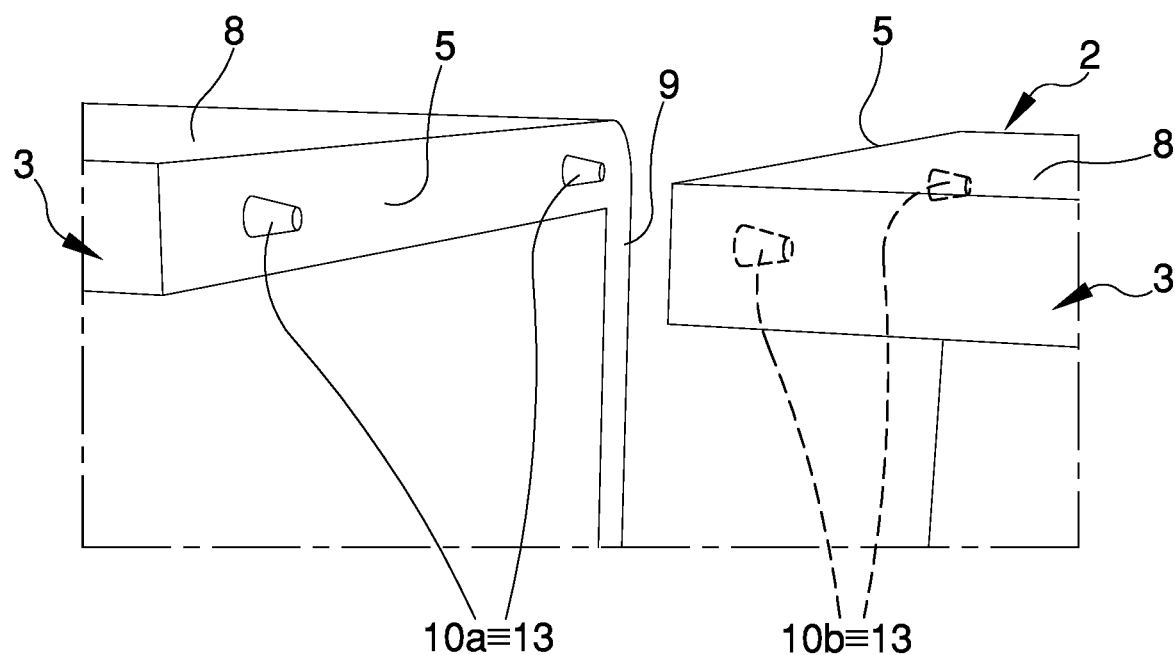
FIG. 3 is an axonometric view of a detail of the modular housing structure according to the invention.
Figure 4:
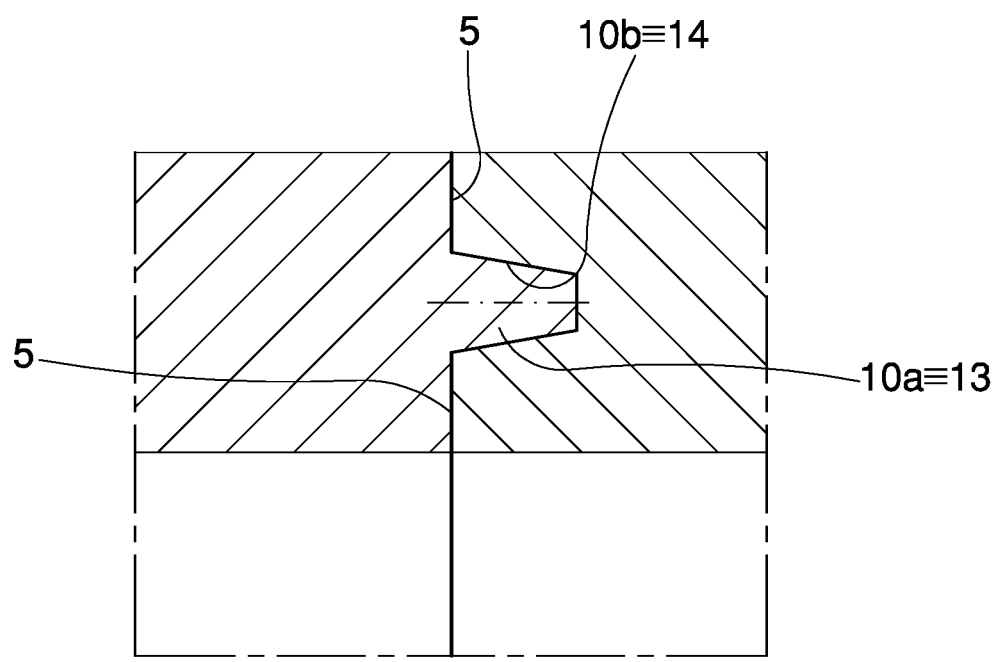
FIG. 4 is a sectional view of the detail of FIG. 3.

With particular reference to these figures, reference numeral 1 globally indicates a modular housing structure.

The modular housing structure 1 comprises a plurality of modular elements 2 each having a relative bearing structure 3 which defines an inner housing volume 4.

For the purposes of this discussion, by "inner housing volume" is meant the volume delimited by the bearing structure 3 and within which the desired housing environments can be set up.

Advantageously, the modular elements 2 are rather small in size, making them easy to transport to the installation site and making the realization of the modular housing structure 1 remarkably flexible.

Each of the bearing structures 3 comprises at least a relative junction surface 5 intended to contact the junction surface 5 of the adjacent bearing structure 3 as a result of their mutual coupling.

In the particular embodiment shown in the illustrations, each modular element 2 is provided with a plurality of junction surfaces 5.

Conveniently, each of the modular elements 2 comprises at least one open wall accessible from the outside, so that each modular element 2 is open on at least one side.

Moreover, each of the modular elements 2 comprises at least one auxiliary wall 6 which is associable in a removable manner with the open wall, so as to define an outer wall and/or an intermediate wall for the division of the interior environments.

The auxiliary wall 6 consists of a panel associable with the bearing structure 3 by means of suitable means such as rails or the like and equipped with auxiliary elements, such as, e.g., window and door frames that comprise at least one transparent portion, etc.

The bearing structures 3 are associated at the relative open wall so as to place in communication the relative inner volumes 4.

Conveniently, the bearing structure 3 also comprises at least a substantially horizontal basement 7 on which the inner flooring is made and at least one opposite covering element 8 and substantially parallel to the basement itself. As shown in the illustrations, the bearing structure 3 comprises at least one lateral wall 9 which at least partially delimits the inner volume 4, although the possibility of providing a different number of walls 9 cannot be ruled out.

Usefully, each of the modular elements 2 also comprises relative sealing means adapted to operate in conjunction with the adjacent modular element 2 as a result of their mutual coupling, so as to ensure the sealing of the modular housing structure 1 once assembled, preventing for example water infiltration.

In particular, in the present embodiment, the relative sealing means are associated with the junction surfaces 5 of the relative bearing structures 3.

Advantageously, each of the relative bearing structures 3 also comprises a plurality of predefined ducts for the passage of fluid operated piping or electrical wiring, so that they do not need internal modifications after assembly.

In the embodiment shown in the figure, the relative bearing structure 3 of each modular element 2 has a substantially C-shaped conformation, although the possibility of providing conformations of a different type cannot be ruled out.

In this specific case, the junction surfaces 5 coincide with the lateral surfaces of the modular element 2.

In the particular embodiment shown in the illustrations, each modular element 2 comprises a plurality of relative open walls.

Advantageously, each modular element 2 is provided with removable union means 10a, 10b for the reciprocal connection which are associated with the bearing structure 3.

Preferably, the union means 10a, 10b are defined at least on the junction surface 5, whereby the connection of the various modular elements 2 takes place by juxtaposition of the junction surfaces 5 of the bearing structures 3 adjacent to one another and the interconnection of the union means 10a, 10b defined on each junction surface 5.

According to the invention, each of the modular elements 2 comprises union means 10a, 10b of the magnetic type adapted to the reciprocal connection of the modular elements themselves in a removable manner.

The modular elements 2 are then put together with the use of the union means 10a, 10b of the magnetic type, which allow maintaining the modular housing structure 1 assembled for as long as necessary and separating them easily if necessary, in order to easily move or remove the modular housing structure 1 and to change its configuration according to the needs of the user.

In particular, it is possible to associate with each other any number of modular elements 2 through the union means 10a, 10b, thus making a modular housing structure 1 having dimensions, number and arrangement of the desired interior environments.

Advantageously, the union means 10a, 10b comprise at least one magnetizable element 10a associated with the bearing structure 3 of a modular element 2 and at least one ferromagnetic element 10b associated with the bearing structure 3 of the adjacent modular element 2.

Conveniently, the modular housing structure 1 comprises one supporting element 11 associated with the basement 7 of a plurality of modular elements 2 by means of relative anchoring means 12a, 12b, by providing a support for the arrangement and installation of the modular elements themselves.

Preferably, the supporting element 11 is of the type of a sheet-like element, although the possibility of providing a supporting element 11 of a different type cannot be ruled out.

Advantageously, the anchoring means 12a, 12b are of the magnetic type, although the possibility of providing the modular housing structure 1 with anchoring means 12a, 12b of a different type cannot be ruled out.

In particular, similarly to the union means 10a, 10b, the anchoring means 12a, 12b comprise at least one magnetizable element 12a associated with one of the bearing structure 3 of the relative modular element 2 and the supporting element 11 and at least one ferromagnetic element 12b associated with the other of the supporting element 11 and the bearing structure 3 of the relative modular element 2.

In the embodiment shown in the illustrations, at least one of the union means 10a, 10b and the anchoring means 12a, 12b comprise a plurality of magnetizable elements 10a, 12a and a plurality of ferromagnetic elements 10b, 12b.

By the expression "magnetizable element" used herein is meant an element adapted to provide an attractive magnetic field on the ferromagnetic element 10b, 12b.

As mentioned previously, the connection between the modular elements 2 is of the removable type, so that they can be assembled and disassembled according to the user's needs and with very fast timing.

Each magnetizable element 10a, 12a, in fact, is an element that can be activated and deactivated by the user and is adapted to exercise an attractive action on the relative ferromagnetic element 10b, 12b so as to maintain a stable connection during use.

Conveniently, therefore, the modular housing structure 1 comprises activating means for activating the magnetizable elements 10a, 12a, which allow defining an attractive magnetic field of the relative ferromagnetic elements 10b, 12b.

The modular housing structure 1 also comprises deactivating means of the magnetizable elements 10a, 12a so as to deactivate the attractive magnetic field and allow the disconnection of the modular elements 2.

Each magnetizable element 10a, 12a is of the type of a magnetizable element 10a, 12a with reversible polarity, which has the characteristic of being activated and deactivated by the supply of electric current, so as to allow or not the attractive action on the ferromagnetic element 10b, 12b.

These magnets consist of an inner portion made of a metal alloy typically containing aluminum, iron, nickel and cobalt in varying percentages, used in association with high potential magnets, such as, e.g., neodymium magnets.

The various portions of the magnets are also electrically connected to coils which, through the flux of electric current, generate a magnetic field, while the external block can be made of steel.

The flow of current therefore permits modifying the behavior of the magnet, switching from a deactivation condition in which the flow of the magnetic field is conveyed exclusively inside the magnetizable element 10a, 12a and no attractive action is observed, to an activation condition in which the flux of the magnetic field is not confined and the attractive action on the ferromagnetic element 10b, 12b is observed.

Usefully, the switch from the activation condition to the deactivation condition and vice versa requires the supply of electric current for a very limited time interval, which helps to minimize the time required for assembly.

Advantageously, therefore, when the magnetizable element 10a, 12a is in the activation condition, the stable connection between the modular elements 2 themselves and/or with the supporting element 11 is maintained, while in the deactivation condition the attractive action is cancelled and the disconnection of the various parts occurs.

The possibility of using a magnetizable element 10a, 12a other than a magnet with reversible polarity which allows the reciprocal connection to be made in a removable manner, such as the use of permanent magnets associated with deactivation coils, cannot however be ruled out.

In the particular embodiment shown, at least one of the activating means and the deactivating means are of the electric type, such as an electric generator or the like, although the possibility of providing activating means and deactivating means of different type cannot be ruled out.

Suitably, at least one of the magnetizable elements 10a, 12a and the ferromagnetic elements 10b, 12b define at least a projection 13 outwards, while the other of the ferromagnetic elements 10b, 12b and the magnetizable elements 10a, 12a define at least a hollow seat 14 in which the projection 13 can be inserted, so as to allow the connection between the modular elements 2 themselves and with the supporting element 11.

In the particular embodiment shown in the illustrations, the projection 13 and the seat 14 have a substantially truncated-cone shape and complementary to each other, although the possibility of providing different shapes cannot be ruled out.

As shown in the illustrations, the modular housing structure 1 comprises at least one floating hull 15 associated with the supporting element 11.

Specifically, the supporting element 11 is interposed between the hull 15 and the modular elements 2.

This way, therefore, the housing portion of a boat is made using the modular elements 2, allowing managing the internal space distribution in a flexible way.

Furthermore, the possibility of arranging the supporting element 11 on a different type of installation surface, such as any plot of land, cannot be ruled out.

It has in practice been found that the described invention achieves the intended objects.

In this regard, the fact is underlined that the particular solution of providing a modular housing structure allows making use of a modular structure and managing the internal spaces of the structure in a flexible way.

Furthermore, the particular solution of providing for the removable assembly of modular elements by means of activatable and deactivatable union means permits reducing the times and costs tied to the assembly and installation of the structure itself.

Furthermore, the particular solution of providing modular elements of small dimensions that can be assembled by means of union means in a removable manner permits eliminating the need to resort to oversize load transport for transport to the place of installation.

The invention claimed is:

1. A Modular housing structure comprising:
a plurality of modular elements each having a relative bearing structure defining an inner housing volume,
wherein each of said modular elements comprises relative removable union means for a reciprocal connection,
wherein said relative removable union means are associated with said bearing structure and is magnetic, and
wherein said plurality of modular elements comprise relative sealing means adapted to operate in conjunction with the adjacent modular element as a result of their mutual coupling.

2. The Modular housing structure according to claim 1, wherein each of said bearing structures has a relative junction surface intended to contact the junction surface of the adjacent bearing structure as a result of their reciprocal coupling.

3. The Modular housing structure according to claim 2, wherein said union means are defined at least on said junction surface.

4. The Modular housing structure according to claim 1, wherein said union means comprise at least one magnetizable element associated with said bearing structure of a modular element and at least one ferromagnetic element associated with the bearing structure of the adjacent modular element.

5. A Modular housing structure comprising:
a plurality of modular elements each having a relative bearing structure defining an inner housing volume,
wherein each of said modular elements comprises relative removable union means for a reciprocal connection,
wherein said relative removable union means are associated with said bearing structure and is magnetic, and
wherein each of said bearing structures defines a relative basement and comprises at least one supporting element associated with the basement of a plurality of said modular elements by in means of relative anchoring means.

6. The Modular housing structure according to claim 5, wherein said anchoring means is magnetic.

7. The Modular housing structure according to claim 6, wherein said anchoring means comprise at least one magnetizable element associated with one of the bearing structure of the relative modular element and said supporting element and at least one ferromagnetic element associated with the other of said supporting element and the bearing structure of the relative modular element.

8. The Modular housing structure according to claim 7, wherein said union means comprise at least one magnetizable element associated with said bearing structure of a modular element and at least one ferromagnetic element associated with the bearing structure of the adjacent modular element and wherein one of said magnetizable elements and said ferromagnetic elements defines a projection outwardly and that the other of said ferromagnetic elements and said magnetizable elements defines a hollow seat for housing said projection.

9. The Modular housing structure according to claim 8, wherein said projection and said seat have a substantially truncated-cone shape.

10. The Modular housing structure according to claim 8, further comprising: activating means of said magnetizable elements so as to define an attractive magnetic field of the relative ferromagnetic elements.

11. The Modular housing structure according to claim 10, further comprising: deactivating means of said magnetizable elements so as to deactivate said attractive magnetic field.

12. The Modular housing structure according to claim 11, wherein at least one of said activating means and said deactivating means is electric.

13. The Modular housing structure according to claim 5, further comprising: at least one floating hull associated with said supporting element, the latter being interposed between said hull and said modular elements.

14. The Modular housing structure according to claim 1, wherein each of said bearing structures has at least one open wall accessible from the outside.

15. The Modular housing structure according to claim 14, wherein each of said modular elements comprises at least one auxiliary wall associable in a removable manner with said open wall.

16. The Modular housing structure according to claim 1, wherein each of said bearing structures has a relative junction surface intended to contact the junction surface of the adjacent bearing structure as a result of their reciprocal coupling and wherein said sealing means are associated with said junction surface of said relative bearing structure.

17. The Modular housing structure according to claim 1, Wherein each of said bearing structures comprises a plurality of predefined ducts for the passage of fluid-operated piping or electrical wiring.

18. The Modular housing structure according to claim 5, wherein each of said bearing structures has a relative junction surface intended to contact the junction surface of the adjacent bearing structure as a result of their reciprocal coupling.

19. The Modular housing structure according to claim 18, wherein said union means are defined at least on said junction surface.

20. The Modular housing structure according to claim 5, wherein each of said bearing structures has at least one open wall accessible from the outside.

* * * * *